United States Patent Office 2,758,653
Patented Aug. 14, 1956

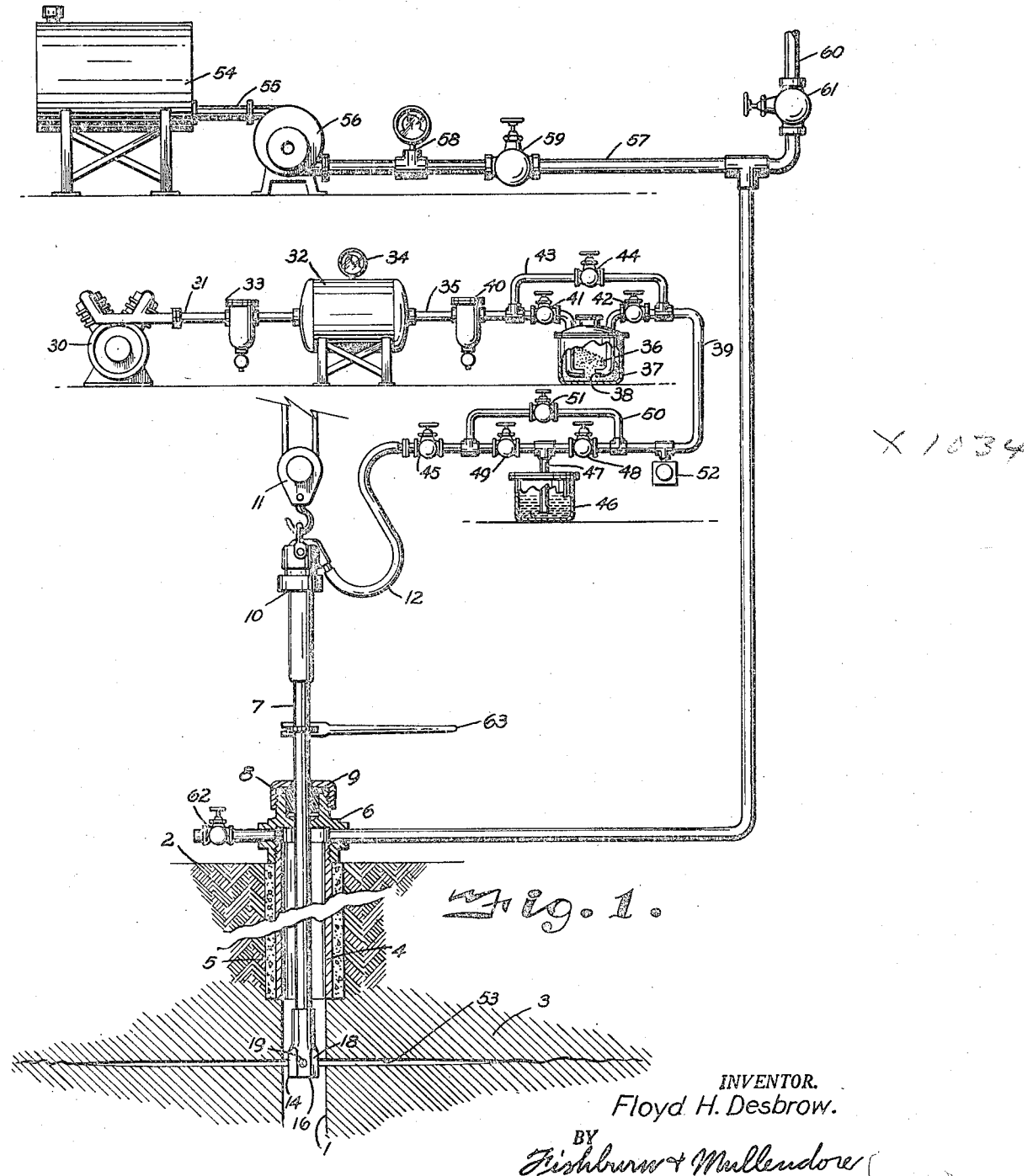

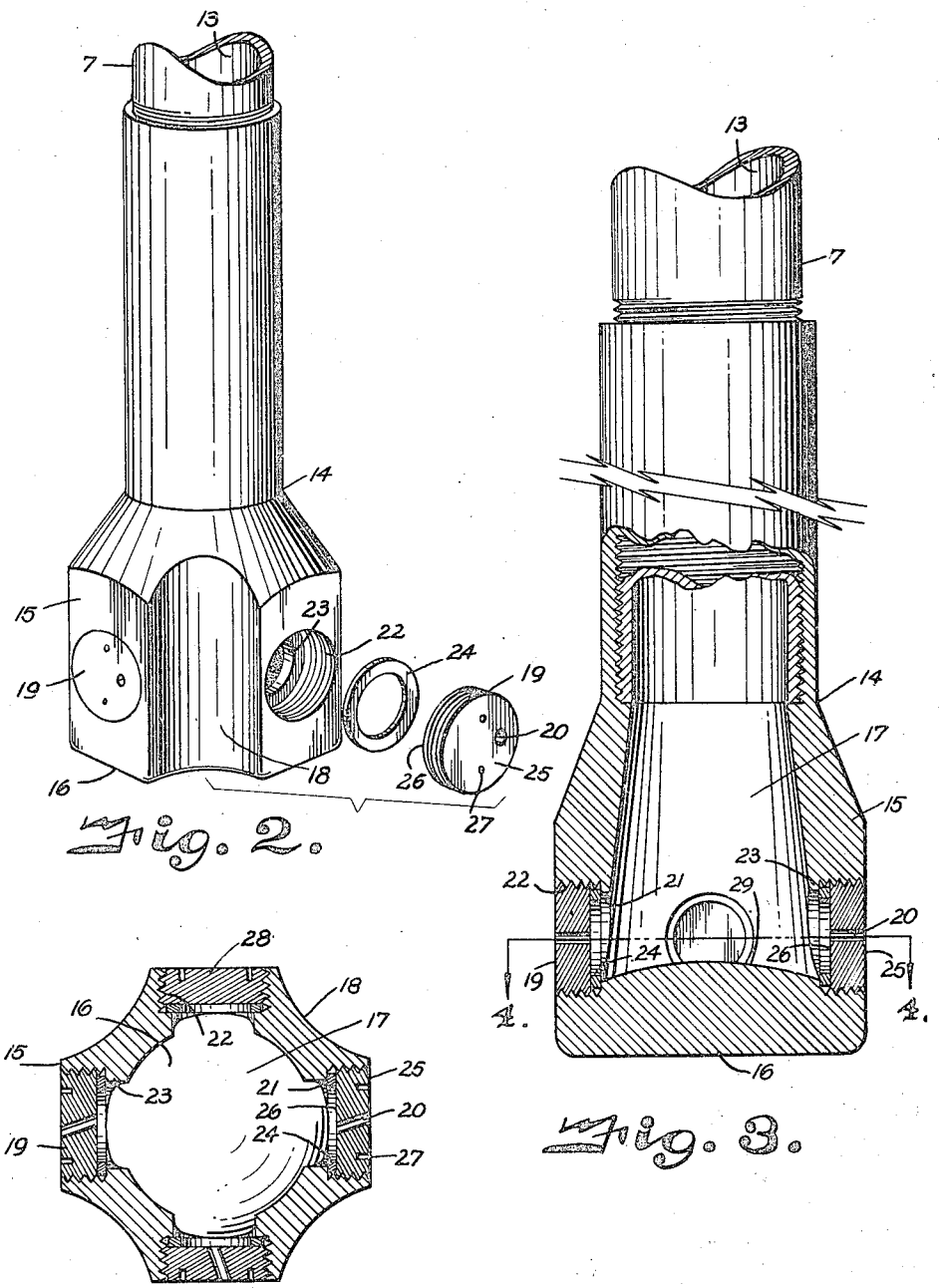

2,758,653

APPARATUS FOR PENETRATING AND HYDRAULICALLY FRACTURING WELL FORMATIONS

Floyd H. Desbrow, Woodward, Okla.

Application December 16, 1954, Serial No. 475,601

4 Claims. (Cl. 166—73)

This invention relates to the treatment of wells, such as oil and gas wells, and more particularly to the method and apparatus for penetrating and fracturing subsurface formations to provide lateral drainage channels at selected levels for increasing the productivity of the well.

Various methods and procedures have been used in efforts to increase the productivity of oil and gas wells, as, for example, detonating explosives to enlarge the well diameter or fracture the formations adjacent selected producing zones, or introducing acids or other chemical reagents to increase the permeability of the formations adjacent the well. More recently methods have been employed to hydraulically fracture petroleum-bearing formations by introducing liquid mixtures under pressure to effect penetration through porous formations and then applying very high pressures on the liquid to effect the fracture in the formation. Numerous liquid mixtures have been used as fracturing agents, for example, various oils and their components have been mixed with jells and other fluids to assist in effecting a fracture and to set up proper reactions within the formation. In many instances it has been found necessary to use jells or other embodying agents with the fracturing liquid to control the time and speed of penetration into the formation to be fractured. Also, sand and other solid substances have been utilized to serve as propping agents to penetrate into the formation and fracture to prevent closing of the fracture. These various prior practices, as they have been employed, have been only partially successful, especially when they have been used in an open hole or uncased formations. One of the reasons for this limited success is that the level of the fracture may not be selected nor can it be extended in a given direction. Great cost is encountered and many wells have been abandoned because of an uncontrolled fracture which allowed gas or water to enter the well rendering it useless or expensive to repair. Some old abandoned oil fields are being redrilled and produce profitably by the use of hydraulic fracturing, however, with the processes that have been used, great hazards are encountered in the reclaiming of these old fields due to the likelihood of extending the fracture in the wrong direction and communicating with one of the abandoned wells and allowing water to come in. By the hydraulic fracturing method that has previously been employed, it is necessary to penetrate the formation to be fractured with a fracturing liquid and as the means of penetration is by hydraulic pressure, the porosity of the structure to be fractured is an important determining factor as to the amount of pressure necessary to force the penetration, and, since the porosity is not entirely known, the amount of pressure necessary to force the penetration, or to complete a fracture, is often unknown. Operators skilled in the art of hydraulic fracturing seldom estimate the pressure required within several hundred pounds, and this unknown quality makes it difficult to provide any controlled extent of fracture.

The objects of the present invention are to provide a method for increasing the production of gas and oil wells by a combined forming of a cavity extending in to a sub-surface formation at a selected level and direction and hydraulically fracturing the formation from the cavity; to provide an improved method of completing or reworking wells by cutting a cavity of selected extent and location in the formation whereby a fracture may be formed by applying a substantially predetermined relatively low hydraulic pressure in the cavity; to provide an improved method of hydraulically fracturing subsurface formations and providing horizontal, vertical or sloping fractures at angles between the horizontal and vertical; to provide apparatus for forming a cavity or passage extending into subsurface formations from a well, including jet nozzles with structure for imparting a rotative and up and down movement to the nozzles and applying a fluid under pressure and/or fluid under pressure containing an abrasive material to the nozzles for direction against the formation; and to provide such an apparatus with structure for applying hydraulic pressure to the formation for fracturing same; to provide such an apparatus with structure for selectively applying fluids together with desired materials for effecting penetration or perforations in the well casing and/or formations; and to provide a method and apparatus for efficiently and quickly penetrating and forming cavities in subsurface formations at selected levels or planes and applying hydraulic pressure thereto for fracturing same.

In accomplishing these and other objects of the present invention, I have provided improved details of structure, the preferred forms of which are illustrated in the accompanying drawings, wherein:

Fig. 1 is a diagrammatic view of the apparatus for effecting cavity formation and applying hydraulic pressure to subsurface formations for fracturing same.

Fig. 2 is a perspective view of the jet head on the lower end of the well tubing with one of the jet plates or nozzle members disassembled therefrom.

Fig. 3 is a vertical, sectional view through the jet head and jet plates therein.

Fig. 4 is a horizontal sectional view through the jet head on the line 4—4, Fig. 3.

Referring more in detail to the drawings:

1 designates a well bore hole extending from the surface 2 of the ground downwardly into a fluid productive formation 3. The portion of the bore hole 1 above the producing formation is preferably cased by a suitable casing 4 secured and sealed in place as by cement 5, or the like. The casing 4 preferably extends above the surface 2 of the ground and has a casing head 6 suitably secured on the upper end thereof.

A tubing 7 extends downwardly through the casing head and casing to approximately the producing formation 3, said tubing extending through a suitable gas-tight seal 8 in the casing head. The structure in the casing head forming the seal for the tubing preferably includes a gasket or ring 9 that is compressed into engagement with the tubing 7 to effect a gas-tight joint and still permit the tubing to be raised and lowered and also rotated. The pressure gasket is preferably made of suitable compressible material that is impervious to the fluids to be used in the apparatus, for example, suitable synthetic resins such as "neoprene" or the like.

The upper end of the tubing 7 is connected to a suitable swivelhead 10 which is supported in a derrick, or the like, by means of a traveling block 11, said swivelhead 10, being connected with a suitable duct, such as a hose 12, providing communication therefrom to the interior of the tubing 7 for the flow of fluids and other materials through the bore 13 of said tubing.

A jet head 14 is suitably secured to the lower end of the tubing 7, said head having sidewalls 15 and a closed lower end 16 defining an interior chamber 17 having communication with the bore 13 of the tubing 7. The jet head is of such exterior dimensions as to be freely moveable through the bore of the casing 4 and has vertically extending grooves 18 forming flow passages for fluids and cuttings as later described. Jet plates or nozzle members 19 are preferably removably mounted in the sidewall 15, said jet plates having jet orifices 20 extending therethrough from the exterior and having communication with the chamber 17.

In the structure illustrated, the walls 15 are provided with a plurality of radially arranged bores 21 extending outwardly from the chamber 17. The bores 21 are preferably provided with threaded counter-bores 22 extending inwardly from the outer surface of the jet head, said counterbores cooperating with the bore 21 to form a shoulder 23 therebetween. The jet plates 19 have threads on the peripheries thereof corresponding to the threaded bore 22 whereby the jet plates may be screwed into the threaded counter-bores. The ring members 24 are arranged between the jet plates 19 and the shoulder as whereby the jet plates can be threaded into the threaded bores 22 and tightened down on the rings 24 whereby said rings form shims for the jet plate.

The jet orifices 20 extend through the plates 19 at an angle to a line perpendicular to the faces of the plate 19 or at an angle to a radiant extending through the center of the plate. In other words, the orifice, at the outer face 25 of the plate 19, is off center and said orifice extends through the center line and at the inner-surface 26 of the plate is off-center in a similar manner and opposite to its location at the outer face, whereby a stream or jet issuing from the orifice 20 will strike the side surface of the well bore at an acute angle. The jet plate has spaced recesses 27 or other means adapted to be engaged by wrench grips for rotating said plate. Varying of the thickness of the shim 24 will vary the direction of the jet orifices 20 when the plate 19 is tightened against the shim. Any number of jet plates 19 may be utilized, and, in the illustrated structure, there are four counter-bores 22 with plates 19 having orifices therein in three and a blank plate 28 in the other so as to provide three orifices. Also, the jet head may be varied whereby a plurality of orifices may be arranged in vertically spaced relation therein as well as horizontally. The inner surface of the bottom wall is preferably arcuate or convex as at 29 to aid in directing the abrasive material and fluid toward the jet plates.

The material supplied to the jets may be any suitable fluid or liquid, with or without abrasive materials, as desired. In the illustrated structure, the fluid supply is shown as a compressor 30 having its discharge connected to a duct 31 for delivery of the fluid to a storage tank 32. A suitable water trap 33 is preferably arranged in the duct 31 when air is the fluid. The tank 32 is preferably provided with a gauge 34 for indicating the amount of pressure of the fluid therein.

A duct 35 communicates the tank 32 with an abrasive supply 36 arranged in a container 37, the duct 35 discharging adjacent the bottom of the container with said discharge spaced from an inlet 38 of a duct 39 leading from the container. A water trap 40 is preferably arranged in the duct 35 and valves 41 and 42 are arranged in the duct 35 and duct 39 adjacent the container 37. A by-pass duct 43 communicates with the duct 35 ahead of the valve 41 and with the duct 39 beyond the valve 42. A valve 44 is preferably arranged in the by-pass duct 43 whereby closing the valve 44 and opening the valves 41 and 42 will cause abrasive material to enter the fluid stream and be carried thereby through the duct 39, and, if the valves 41 and 42 are closed and the valve 44 opened, fluid only will be moved through the duct 39. The duct 39 is connected with the hose 12. It is provided with a valve 45 adjacent said hose which valve serves as the master control of the fluid delivered to the tube 7 for discharge through the jet orifices 20.

A container 46 of acid or other suitable reagent has a tube 47 extending into the reagent and connected to the duct 39, ahead of the valve 45, with valves 48 and 49 arranged in the duct 39 on each side of a tube 47 and a by-pass 50 communicating with the duct 39 ahead of the valve 48 and beyond the valve 49 whereby closing the valves 48 and 49 allows the fluid to pass through the by-pass 50 and on to the tube 12 under control of the valve 45. Opening of the valves 48 and 49 and closing of valve 51 in the by-pass 50 will cause the fluid to flow by the end of the tube 47 and draw reagent from the container 46 for mixing with the fluid. A sampling jet member 52 is preferably arranged in the duct 39 ahead of the by-pass 50.

Operation of the compressor 30 and opening and closing the valves in the various ducts will provide a selected delivery of material and the fluid from the compressor to the jet head for issuance from the jet orifices 20, as later described, to cut or form a cavity 53 in the formation 3. After a suitable cavity is formed, liquid, under pressure, is preferably used for hydraulically fracturing the formation. The apparatus for such operation preferably includes a liquid supply container 54 connected by a pipe 55 to a pump 56, capable of delivering the liquid at desired pressures. The outlet of the pump 56 is connected to a pipe 57 which is connected with the casing head 6 in a suitable manner for delivering the liquid to the interior of said casing. A pressure gauge 58 is preferably arranged in the pipe 57 for indicating the pressure of liquid delivered by the pump 56. A valve 59 is arranged in the pipe 57 for controlling the flow of liquid therethrough. A pipe 60 preferably having a valve 61 therein is connected to the pipe 57 beyond the valve 59, said pipe 60 leading to a separator or pit for recovering abrasive materials or other materials utilized in the process. A valve control outlet 62 has communication with the interior of the casing head 6. It has spaced relation to the connection of the pipe 57 with said casing head.

The tubing 7 may be raised and lowered by mechanism, not shown, connected with the traveling block 11. Also the tubing 7 may be rotated, as, for example, by means of a wrench 63 or oscillated through any angle desired. Also the oscillation or rotation may be performed simultaneously with the raising and lowering of the tubing for controlling the path through which the abrasive or cutting fluid is applied by the jet orifices 20.

The improved method of my invention of increasing the productivity of a well by hydraulically fracturing the productive formation includes the forming of a cavity in the formation at a selected elevation by applying a jet stream of suitable fluid such as compressed air or a liquid, or combinations of both, with or without abrasive material to cut a cavity in the formation to be fractured. The cutting material is applied by jets secured to the end of the tubing 7 and placed in the well adjacent the desired fracture point. The tubing is sealed in the casing head by the pressure gasket 9 adapted to withstand all the pressure involved which is usually less than 2,000 pounds per square inch, and to provide a tight joint that still permits the turning and raising and lowering of the tubing. The upper end of the tubing 7 is connected to the supply of the cutting material. The return line is connected to the casing head below the pressure gasket to allow the cutting material and cuttings to be returned and deposited in a slush pit or run through a separator thereby reclaiming the cutting material for further use.

When air pressure is utilized as the carrier for the cutting material, the pressure preferably will range from 50 pounds to 500 pounds per square inch. It has been found that the average pressure will approximately be 400 pounds per square inch. The sizes of the orifices may be from $1/16$ to $5/16$ of an inch or larger and the abrasive material may be of any suitable substance but must be of a proper particle size to flow freely through the jet orifices and of sufficient hardness to displace the formation against which it is applied. On sandstone formations at a depth of 1,000 feet, more or less, a fine-graded hard sand makes an effective and practical abrasive. At greater depths or in harder formations, a metallic abrasive is fine-chilled steel substance or an oxide such as aluminum oxide. Very satisfactory results have been obtained by using the abrasive in a particle size of $\frac{1}{16}$ mm. to 2 mm. in diameter. The particle, orifice size and pressure are preferably varied according to the density of the formation to be fractured. For example, I have found that a steel wall casing, such as is commonly used in oil and gas wells, and with a wall thickness of $\frac{1}{4}$ inch, may be penetrated through the entire thickness in one and one-half minutes using 150 pounds per square inch air pressure with a mixture of aluminum oxide being mixed with the air stream at a rate of 3 pounds per minute and delivered through a jet of $\frac{3}{16}$ of an inch bore and held firm in a position about 1 inch from the steel surface. This same result may be accomplished by using sand as an abrasive and the time required is greater. Likewise in cutting sandstone formations or hard limestone formations, I have found that a sand abrasive is almost equal in speed of cutting to aluminum oxide. Therefore, various materials may be utilized to obtain one of the objects of the operation which is to establish a void or cavity in the formation at a desired elevation by erosion caused by the jetting of the cutting material thereon.

I have found that when a jet of cutting material is exerted against a surface at an acute angle, the pressure exerted against the surface is equal to the change in the momentum of the cutting material and when the jet strikes a curved surface, said surface deflects the jet stream and changes the direction of the velocity but power remains in the stream of cutting material and may extend over a considerable length of surface.

In my invention, the jet stream strikes the surface of a formation at an acute angle, the direction of which is determined by the position of the jet orifices in the jet head, as determined by rotation of the plates 19 and the thickness of the shims 24. One or more jet orifices may be utilized and the cut may be vertical by raising and lowering the tube 7, or the cut may be horizontal by rotating the tube 7, the length of the cuts being proportional to the extent of raising and lowering movement or the rotation or both.

In performing my method, the desired position of the jet orifices 20 is established and the jet plates fit in the jet head on the tubing 7. The tubing 7 and jet head thereon are lowered into the well casing 4 and adjusted to position the jet orifices at the level where the fracture is desired. Then the apparatus is connected as illustrated.

If there is liquid standing in the bore hole above the level of the jets, the compressor 30 is operated and valves 41, 42, 48, 49, 59 and 61 are closed and valves 44, 51, 45 and 62 are opened, then relative high air pressure is delivered through the jet orifices 20 to blow the liquid in the bore hole upwardly through the casing and through the valved discharge 62. Then the valve 62 is closed and valve 61 opened and the air stream, regulated to approximately 100 pounds per square inch of pressure, delivered to the jets. Valve 44 is then closed and valves 41 and 42 opened to add the abrasive to the air stream. As the abrasive mixing is started, the jets are rotated forward and backward by turning the tubing to which the jets are attached. If one jet is used, a turn of the tubing 90° in one direction will cause the jets to cover a path one-fourth the circumference of the wall of the well, and, of course, if four jets are used, a turn of the tubing of 90° will cause the jets to cover the entire circumference of the well at the line or level where the cut or cavity is desired. It is preferable that low pressure be used to start the cutting so as to obtain a truer channel of cutting and avoid the blasting or chipping off of the formation that sometimes results with high pressure. After maintaining the relatively low pressure abrading action and rotating the jets for a period, for example five minutes, to obtain the initial cut as desired, the fluid pressure is preferably raised to approximately 150 pounds per square inch and the operation continued. As the abrasive material and fluid is delivered through the jet orifices cutting the formation to form the void or cavity therein, the fluid, cutting material and cuttings are forced upwardly through the casing 4, pipe 57 and pipe 60 to a separator or pit for recovery of the cutting material. The progress of the cutting operation is judged by analyzing the return air flow. As a decline in the return of eroded formation is noted, the air pressure is raised and in some instances a heavier mixture of abrasives may be added. It has been found that after this progressive procedure has been followed for approximately 30 minutes, using an average sandstone petroleum bearing formation as an example, a cavity or cleft about one inch to one and one-half inches in width and having a radius of about 40 inches will have been formed by the action of the jets. It is to be noted that with such a cavity approximately 5,000 square inches of working surface is available for application of hydraulic pressure for fracturing purposes. The cutting is continued with suitable fluid pressure and abrasives, or other suitable material, until the cavity is deemed large enough or provides desired surface area.

After the cavity of desired size is completed, valves 41 and 42 are closed and valve 44 opened to apply air alone through the jet orifices. This action cleans loose formation and abrasives from the cavity and the formation in the well, and after the cleaning operation is completed, the valves 45 and 61 are closed. It is to be noted that while a portion of the pipe 57 is utilized for the return of the cutting material and delivered through the pipe 60, said pipe 60 may be connected directly to the casing head and after the cleaning operation, said return or exhaust line may be disconnected from the casing head and a liquid pressure line attached thereto and connected to the liquid pressure pumping equipment such as illustrated.

Fracture of the formation is accomplished as follows:

The valves 62 and 59 are opened and the pump 56 operated to supply a hydraulic liquid to the casing to completely fill the well and the cavity formed by the jets in the formation to be fractured. After the well is filled with the liquid, as will be seen by the liquid flowing from the valve 62, said valve is closed. Then the pumping action is continued as rapidly as possible to insure a quick buildup of pressure on the hydraulic liquid. Ordinary well service equipment utilized in fracturing is capable of applying 500 to 1000 pounds per square inch hydraulic pressure in from one to five minutes. As no pressure is required to force the penetration of the fracturing liquid into the petroleum bearing formation, the formation will fracture with a low pumped pressure. As an example, the cavity formed will be such that the force applied by the hydraulic pressure will be the surface area of the cavity multiplied by the pressure in pounds. Obviously with relatively large cavities formed in the formation, very large forces may be applied with relatively low hydraulic pressure.

The hydraulic liquid may be any desired or a mixture of liquids. It is found that water may be utilized satisfactorily, however, it is preferable that a crude oil of approximately the same viscosity as the liquids produced by the well be utilized. Also sand or other suitable propping agents may be introduced into the hydraulic liquid and carried thereby into the fracture cavity, whereby, after the fracture has occurred, the sand or propping agent will extend through the fracture area to prevent the fracture closing.

The occurrence of the fracture is indicated by the pressure gauge 58. The pump 56 is operated to continue to raise the pressure on the hydraulic liquid, then when the fracture occurs there is a sudden lowering of the pressure indicated by the gauge 58. After the fracture occurs, further liquid and a propping agent may be pumped into the well at the option of the operator.

In forming a vertical fracture, the same procedure is generally followed except instead of rotating the tube 7, it is raised and lowered. Also the jets are preferably placed in such a manner that they will issue the stream in the desired direction or plane of the desired fracture. After the vertical fracture occurs, it is not necessary to provide a propping agent.

In instances where the fracture is desired in a cased formation, the method is used to apply the fluid and abrasive to cut a vertical slit for a vertical fracture or by cutting the casing completely in two for a lateral fracture, then the process may be continued as above described, for forming the cavity in the formation and obtaining the fracture of same. The pneumatic jet process may also be used to enlarge the bore hole for natural production, and for perforating in cased productive areas for natural production.

The reagent in the container 46 may be applied to the formation with air pressure for forming a suitable cavity in preparation for hydraulic fracturing. A suitable quantity of the chemical reagent being atomized upon contacting the air stream and sprayed through the jet orifices against the well formation to dissolve that part of the sedimentary formation which serves as a bonding or cementing tissue and as the formation becomes dissolved by the action of the chemical reagent, it is forced from the well by the returning air flow. The chemical reagent may be used on such formations as muds, clays, shales, marls, sandstone, limestone or dolomite. Also the abrasive material and acid or other reagent may be mixed with the fluid stream at alternate intervals to obtain the desired cavity in the formation.

In utilizing my method the forming of the cavity as described provides a selected area for application of the hydraulic pressure, and, also determines the level at which the pressure is applied in the starting of the fracture. This locating of the application of the pressure provides a more accurate location and direction of fracture than has previously been obtained. It is also believed obvious that this method permits the fracturing with much lower hydraulic pressures than have previously been necessary.

What I claim and desire to secure by Letters Patent is:

1. Apparatus for developing passages for liquid through an underground formation adjacent a well bore comprising, a tubing extending in the well bore and casing to a producing formation, means in the well bore sealingly engaging the tubing, means supporting the tubing in the well bore, a jet head on the lower end of the tubing and having radial bores therein, plates removably mounted in the jet head to close the radial bores therein, selected plates having jet orifices extending therethrough at an angle to a radiant axially of the respective plate whereby jets issuing from the jet orifices strike the side of the well bore at an acute angle, said plates being movable in the jet head to adjust the jet orifices whereby the jets issuing therefrom are in the plane of the desired cut, and means having communication with the tubing for delivering fluid under pressure to the tubing and effective discharge of same through the jet orifices for cutting the formation.

2. Apparatus for developing passages for liquid through an underground formation adjacent a well bore comprising, a casing enclosing a portion of the well bore, a casing head on the upper end of said casing, a tubing extending through the casing head and casing to a producing formation, means in the casing head sealingly engaging the tubing and permitting movement of the tubing relative to the casing head, means engaging the tubing for selectively moving same, a jet head on the lower end of the tubing and having radial bores therein, plates removably mounted in the jet head to close the radial bores therein, selected plates having jet orifices extending therethrough at an angle to a radiant axially of the respective plate whereby jets issuing from the jet orifices strike the side of the well bore at an acute angle, said plates being movable in the jet head to adjust the jet orifices whereby the jets issuing therefrom are in the plane of the desired cut, means having communication with the tubing for delivering fluid and abrasive material under pressure to the tubing and effecting discharge of same through the jet orifices for cutting the formation, and means for moving the jet head to move the jet orifices therein in the plane of the desired cut in the formation.

3. Apparatus for developing passages for liquid through an underground formation adjacent a well bore comprising, a casing enclosing a portion of the well bore, a casing head on the upper end of said casing, a tubing extending through the casing head and casing to a producing formation, means in the casing head sealingly engaging the tubing and permitting movement of the tubing relative to the casing head, means engaging the tubing for selectively raising, lowering and rotating same, a jet head on the lower end of the tubing and having radial bores therein, plates removably mounted in the jet head to close the radial bores therein, selected plates having jet orifices extending therethrough at an angle to a radiant axially of the respective plate whereby jets issuing from the jet orifices strike the side of the well bore at an acute angle, said plates being movable ing the jet head to adjust the jet orifices whereby the jets issuing therefrom are in the plane of the desired cut, means having communication with the tubing for delivering fluid and abrasive material under pressure to the tubing and effecting discharge of same through the jet orifices for cutting the formation and means for moving the jet head to move the jet orifices therein in the plane of the desired cut in the formation, means including a flow line communicating with the casing head for applying liquid under pressure to the well bore and increasing the pressure of the liquid in the cavity for fracturing the formation, and pressure responsive means connected to the flow line for indicating occurrence of a fracture, 4. Apparatus for developing passages for liquid through an underground formation adjacent a well bore comprising, a casing enclosing a portion of the well bore, a casing head on the upper end of said casing, a tubing extending through the casing head and casing to a producing formation, means in the casing head sealingly engaging the tubing and permitting movement of the tubing relative to the casing head, means engaging the tubing for selectively raising, lowering and rotating same, a jet head on the lower end of the tubing and having jet orifices therein at an angle to a radiant of the head whereby the jets issuing therefrom are in the plane of the desired cut, means having communication with the tubing for delivering fluid and abrasive material under pressure to the tubing and effecting discharge of same through the jet orifices for cutting the formation, means for moving the jet head to move the jet orifices therein in the plane of the desired cut in the formation, means including a flow line communicating with the casing head for applying liquid under pressure to the well bore and increasing the pressure of the liquid in the cavity for fracturing the formation, and pressure responsive means connected to the flow line for indicating occurrence of a fracture.

References Cited in the file of this patent
UNITED STATES PATENTS

| Number | Name | Date |
|---|---|---|
| 1,612,611 | Claytor | Dec. 28, 1926 |
| 1,853,379 | Rotinoff | Apr. 12, 1932 |
| 2,212,491 | Appleby | Aug. 27, 1940 |
| 2,258,001 | Chamberlain | Oct. 7, 1941 |
| 2,302,567 | O'Neill | Nov. 17, 1942 |
| 2,329,157 | Frack | Sept. 7, 1943 |
| 2,547,778 | Reistle | Apr. 3, 1951 |
| 2,699,212 | Dismukes | Jan. 11, 1955 |
| 2,708,567 | Hildebrandt | May 17, 1955 |